United States Patent [19]

Handtmann et al.

[11] 4,269,069

[45] May 26, 1981

[54] PRESSURE SENSOR, ESPECIALLY FOR INTAKE AIR SUCTION PRESSURE

[75] Inventors: Dieter Handtmann, Sindelfingen; Helmut Rau, Gerlingen; Erich Zabler, Karlsruhe, all of Fed. Rep. of Germany

[73] Assignee: Robert Bosch GmbH, Stuttgart, Fed. Rep. of Germany

[21] Appl. No.: 114,573

[22] Filed: Jan. 23, 1980

[30] Foreign Application Priority Data

Mar. 7, 1979 [DE] Fed. Rep. of Germany ....... 2908808

[51] Int. Cl.³ .............................................. G01L 9/00
[52] U.S. Cl. ..................................................... 73/705
[58] Field of Search .......................... 73/705, 708, 723

[56] References Cited

U.S. PATENT DOCUMENTS

| 3,100,997 | 8/1963 | Lorenz | 73/705 |
| 3,215,135 | 11/1965 | Franke | 73/705 |
| 3,503,116 | 3/1970 | Strack | 73/705 |
| 4,210,029 | 7/1980 | Porter | 73/705 |

Primary Examiner—Donald O. Woodiel
Attorney, Agent, or Firm—Frishauf, Holtz, Goodman & Woodward

[57] ABSTRACT

In order to provide immunity against vibrations, a pressure sensor for detecting the prevailing manifold suction pressure in an internal combustion engine, for example, has a movable chamber which responds to the varying pressure and thereby changes the distance between a diffuse reflector and an optical detector assembly. The detector assembly includes a light source, a first light-sensitive detector and a second light-sensitive detector. The second detector is connected to a regulator which so controls the electrical power to the light source that the induced photo current in the second detector remains substantially constant independently of the distance between the reflector and the detectors. A number of embodiments is presented.

6 Claims, 5 Drawing Figures

PRESSURE SENSOR, ESPECIALLY FOR INTAKE AIR SUCTION PRESSURE

FIELD OF THE INVENTION

The invention relates to a pressure sensor for detecting relative pressure, especially the pressure difference between ambient atmospheric pressure and the pressure in the intake manifold of an internal combustion engine. More particularly, the invention relates to a pessure sensor which includes an electric transducer for generating a signal related to the relative displacement of sensor elements due to pressure changes.

OBJECT AND SUMMARY OF THE INVENTION

It is a principal object of the present invention to provide a pressure sensor of the general type described above in which the detection of the relative displacement of sensor elements takes place in non-mechanical (contactless) manner, insuring immunity against vibrations. This object is attained, according to the invention, by providing a pressure cell within which is disposed an optical transducer including a light source, a first detector, a second, reference detector, and a diffuse reflecting surface. The reference detector is used to generate a reference signal that causes a controller to regulate the light output of the light source so as to maintain the detection photo current in the reference detector constant, or substantially constant, independently of the relative separation of the reflecting surface from the reference detector.

In an advantageous embodiment of the invention, the diffuse reflecting surface is the surface of an alumina plate. In another embodiment, the alumina or ceramic plate is accessible from the rear for the purpose of calibration.

Further features of the invention are described in the following detailed explanation of a number of preferred embodiments of the invention which relate to the drawing.

THE DRAWING

DESCRIPTION OF THE PREFERRED EMBODIMENTS

Figure 1:
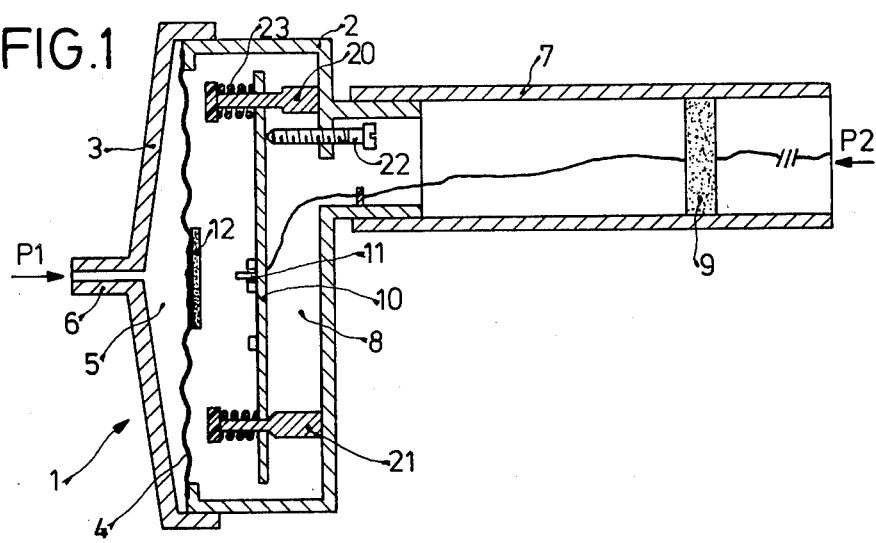
FIG. 1 is an axial section through a first embodiment of the invention.
Figure 2:
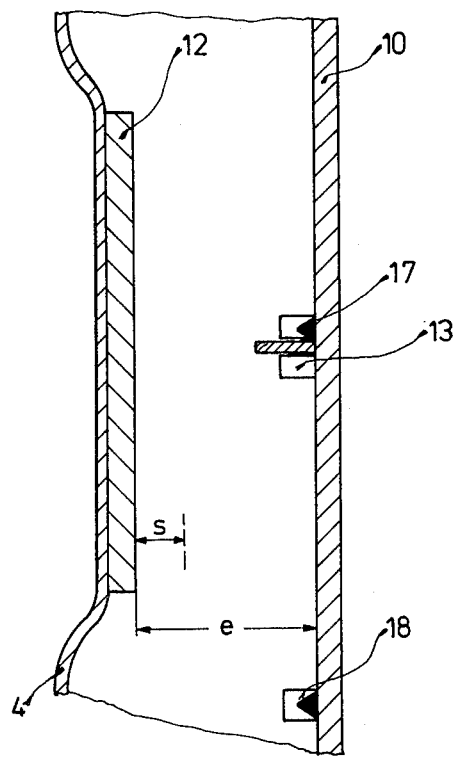
FIG. 2 is a sectional detail of the embodiment of FIG. 1.

The pressure sensor illustrated in FIG. 1 includes a pressure cell 1 consisting of a housing 2 and a cover 3. An internally fastened diaphragm 4 provides an airtight seal of the housing 2, defining a pressure chamber 5 that communicates with the induction tube of an internal combustion engine (not shown) via a nipple 6. The housing 2 is suitably attached to a tube 7 which is open to atmospheric pressure p2 via a pressure-equalizer 9, advantageously constructed of poly-tetra-fluoro-ethylene, which also affords protection against the entry of liquids. Disposed within the pressure cell 1 is a reference mechanism including a base plate 10 that supports an optical detector assembly 11 which is shown in detail in FIG. 2. The assembly 11 comprises a light source 13, for example an incandescent lamp or a luminous diode, disposed on the base plate 10 substantially adjacent to a first light-sensitive detector 17. The light emitted from the source 13 is partially reflected by a diffuse reflector plate 12, made preferably of a ceramic material, for example alumina ($Al_2O_3$). Also disposed on the base plate 10 is a second light-sensitive detector 18 which is connected to a regulator (not shown) that controls the operating current of the light source 13.

The prevailing distance "e" between the ceramic plate 12 and the base plate 10 is measured on the basis of the light reflected by the diffuse reflector 12 which causes a photo current to flow in the detector 17; this current is an analog measure of the distance "e" and hence also of the displacement "s". The signal from the second, reference detector 18 is used to control the light source in such a manner that the photo current in the detector 18 remains constant at all times. This regulation compensates continuously for any changes in the light-generating efficiency of the light source 13, for equal changes in the sensitivity of the detectors 17 and 18, and for any changes in the reflection coefficient of the diffuse reflector plate 12. In order to permit adjustment of the basic setting of the distance between the ceramic plate 12 and the detector mechanism, the base plate 10 is mounted on three spring-loaded pins 20,21 on which its position is determined by a set screw 22.

Figure 3:
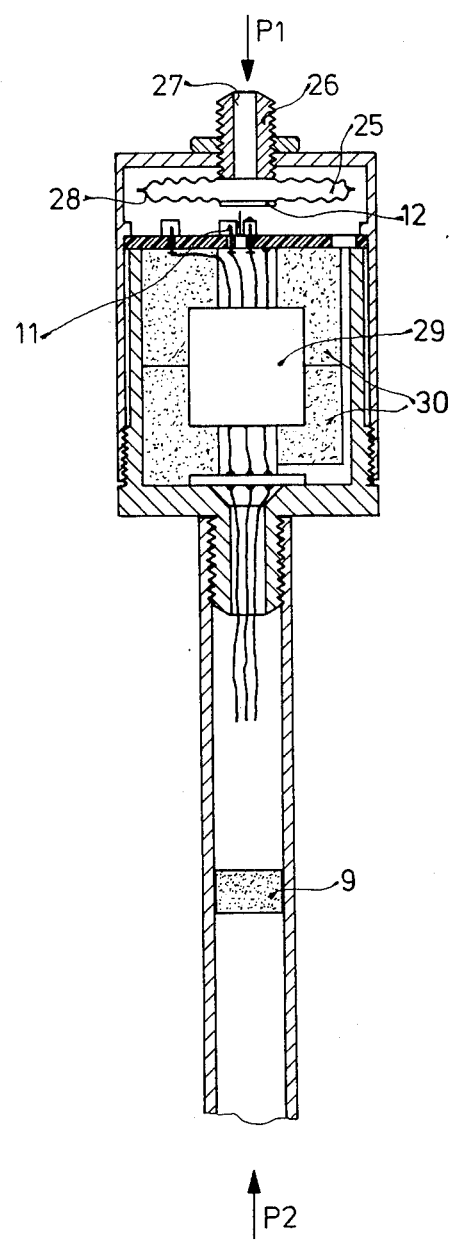
FIG. 3 is an axial section through a second embodiment of the invention.

In a second embodiment of the invention, illustrated in FIG. 3, the diffuse reflector plate 12 is mounted on a diaphragm bellows 25 which is attached to a threaded, hollow shaft 26 which may be connected to the induction tube of an engine in which the pressure p1 prevails. The light-source and light detectors are substantially similar to those already described with respect to the embodiment of FIG. 2. Located below and connected to the sensor assembly 11 is a signal processor 29 which is held between vibration dampers 30.

Figure 4:
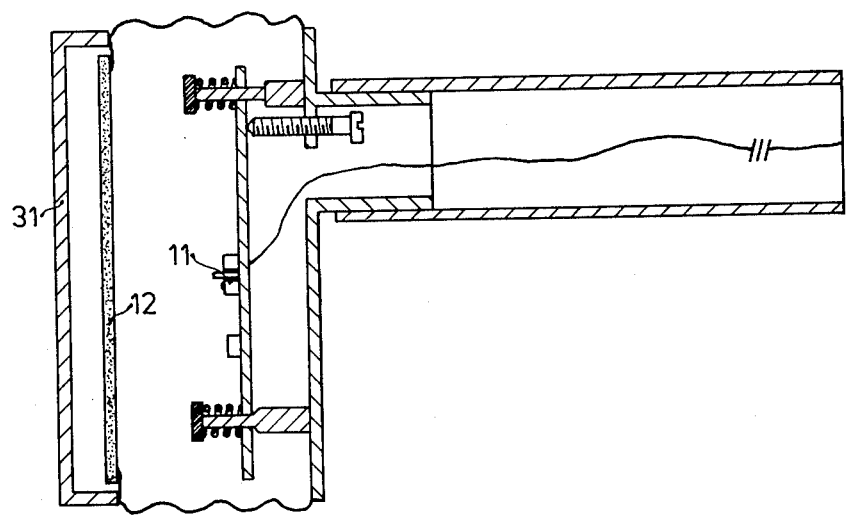
FIG. 4 is an axial section through a third embodiment of the invention.
Figure 5:
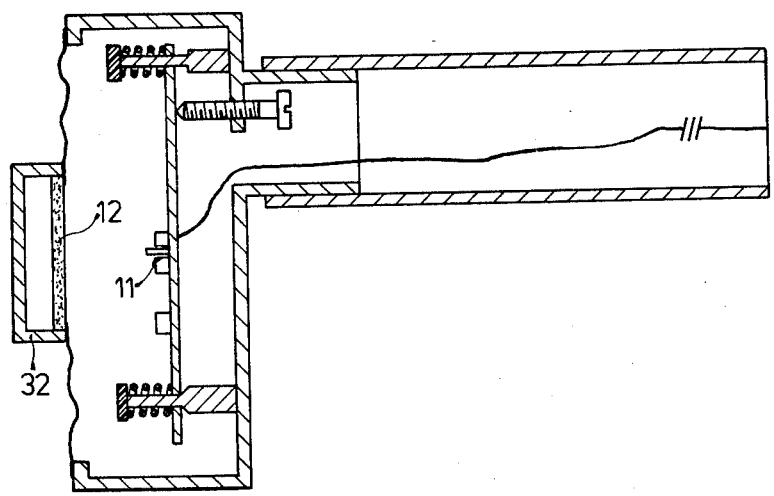
FIG. 5 is an axial section through a fourth embodiment of the invention.

In a third embodiment of the invention, illustrated in FIG. 4, the rear surface of the diffuse reflector plate 12 is accessible for the purpose of partial material removal, for example by means of laser radiation, in order to obtain a given reflection characteristic. Accordingly, the rear surface of the reflecting plate 12 in FIGS. 4 and 5 is covered by removable hoods 31, 32, respectively, which prevent extraneous light from entering the measuring chamber but which may be temporarily removed for calibrating the plate 12. When in place, the hoods 31, 32 share the pressure-induced motions of the plate 12.

The foregoing description relates to preferred, but non-limiting embodiments of the invention. Features of one embodiment may be combined with one or more features of another embodiment and changes lying within the competence of a person skilled in the relevent art may be made, all without departing from the scope and spirit of the invention.

We claim:

1. A pressure sensor, including a housing defining a movable pressure chamber which is connectable to a source of pressure to be measured, and further including transducer means for generating an electrical signal related to the magnitude of said pressure and wherein, according to the invention, said transducer means comprises a diffuse reflector (12) coupled to said movable chamber and a detector assembly (11) including a light source (13), a first light-sensitive detector (17) and a second light-sensitive detector (18) for detecting light reflected by said reflector (12) and further comprising regulator means for so controlling the electrical power of said light source (13) that the photo-current induced in at least one of said detectors (17,18) remains substantially constant independently of the prevailing distance (e) between said reflector (12) and said detector assembly (11).

2. A pressure sensor according to claim 1, wherein said reflector (12) has a bright, diffusely reflecting surface.

3. A pressure sensor according to claim 1, wherein the reflecting surface of said reflector (12) is a surface of a ceramic plate (12).

4. A pressure sensor according to claim 3, wherein said ceramic plate (12) is attached to the center of a diaphragm (4,23).

5. A pressure sensor according to claim 4, wherein said ceramic plate (12) is so disposed as to provide access to its surface remote from said detector assembly (11).

6. A pressure sensor according to claim 5, further comprising a removable, light-opaque hood (31,32) for covering said ceramic plate (12).

* * * * *